(12) United States Patent
Wang

(10) Patent No.: US 9,886,170 B2
(45) Date of Patent: Feb. 6, 2018

(54) BREADTH-FIRST MENU SYSTEM FOR MOBILE APPLICATIONS

(71) Applicant: SAP SE, Walldorf (DE)

(72) Inventor: Yifei Wang, Shanghai (CN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/315,334

(22) Filed: Jun. 26, 2014

(65) Prior Publication Data

US 2015/0378521 A1 Dec. 31, 2015

(51) Int. Cl.
*G06F 3/048* (2013.01)
*G06F 3/0482* (2013.01)
*G06F 9/44* (2006.01)

(52) U.S. Cl.
CPC .......... *G06F 3/0482* (2013.01); *G06F 9/4443* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 6,278,991 B1 | 8/2001 | Ebert | |
| 6,847,387 B2 | 1/2005 | Roth | |
| 7,290,245 B2 | 10/2007 | Skjolsvold | |
| 7,363,060 B2 | 4/2008 | Bernhart et al. | |
| 7,719,930 B2 | 5/2010 | Lee et al. | |
| 7,779,023 B2 | 8/2010 | Smyth et al. | |
| 7,802,203 B2 | 9/2010 | Danninger | |
| 2006/0143574 A1* | 6/2006 | Ito | G06F 3/04817 715/800 |
| 2006/0248474 A1* | 11/2006 | Kimotsuki | G06F 3/0482 715/810 |
| 2009/0172603 A1 | 7/2009 | Young Suk Lee | |
| 2011/0138339 A1 | 6/2011 | Webster et al. | |
| 2012/0023438 A1 | 1/2012 | Xia et al. | |
| 2012/0079427 A1 | 3/2012 | Carmichael et al. | |
| 2012/0151417 A1 | 6/2012 | Wong et al. | |
| 2012/0179996 A1 | 7/2012 | Kulakov | |
| 2012/0221571 A1 | 8/2012 | Orman | |
| 2013/0024815 A1* | 1/2013 | O | H04M 1/72586 715/811 |
| 2013/0191409 A1 | 7/2013 | Zeng et al. | |
| 2014/0082514 A1* | 3/2014 | Sivaraman | G06F 3/0219 715/745 |
| 2014/0136948 A1* | 5/2014 | Miller | G06F 17/30887 715/234 |
| 2015/0177919 A1* | 6/2015 | Lee | G06F 3/0482 715/841 |

\* cited by examiner

*Primary Examiner* — Xuyang Xia
(74) *Attorney, Agent, or Firm* — Jones Day

(57) ABSTRACT

Disclosed herein are technologies for implementing a framework for displaying menu items, across different modules, at the same level on a screen display to allow direct switching to different levels, i.e., without stepping back and forth in levels. This Abstract is submitted with the understanding that it will not be used to interpret or limit the scope or meaning of the claims.

18 Claims, 7 Drawing Sheets

BREADTH-FIRST MENU SYSTEM FOR MOBILE APPLICATIONS

TECHNICAL FIELD

The present disclosure relates generally to a method of displaying menu items for mobile applications.

BACKGROUND

Multi-tasking in desktop applications is a commonly performed activity in which a user may open several child windows to view and operate different objects in the main window of the same program. For a regular computing device, a screen size is commonly above 12 inches in diagonal, and user-inputs are performed through a mouse and a keyboard, while for mobile devices, the screen size is commonly about 5 inches or less diagonally, and user-input may be facilitated by a touch screen.

These discrepancies may bring about a problem in a user interface (UI) design for mobile devices, i.e., the size of the UI elements is configured to be large enough for both good visual effects and accurate touch operations. For example, the computing device screen, even if the resolution is limited to 1024*768, may hold far more UI elements (buttons, menus, text fields, etc.) than the screen size of the mobile device screen with a full high-definition (HD) resolution. On the other hand, if the mobile device utilizes such limited resolution to display a UI element (e.g., a button, menu, or a text field), the UI element may be barely visible and touched accurately by touch-operation input.

SUMMARY

Disclosed herein are technologies for a framework for displaying menu items that allows direct switching to different levels. One aspect of the present framework may include loading an initial breadth-first data structure and receiving a user-input that includes a selection of at least one menu item from the initial breadth-first data structure. Usage-frequency of the selected at least one menu item is compared to a usage-threshold. The breadth-first data structure may be updated based on the received user-input and a result of the comparing to the usage-threshold. The updated breadth-first data structure is loaded and displayed.

In accordance with another aspect, the framework may include an input interface configured to receive a user-input that includes a selection of at least one menu item from an initial breadth-first data structure, and a controller configured to compare a usage-frequency of the selected at least one menu item to a usage-threshold. The controller may update the breadth-first data structure based on the received user-input and a result of the comparing to the usage-threshold. The updated breadth-first data structure may be displayed by a user interface.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for implementing a display of menu items, across different modules, at the same level on a screen to allow direct switching to different levels, i.e., without stepping back and forth in levels. Examples of users include individuals, business or corporate entities, etc. Technologies herein may be applied to computing and mobile applications.

Figure 1:
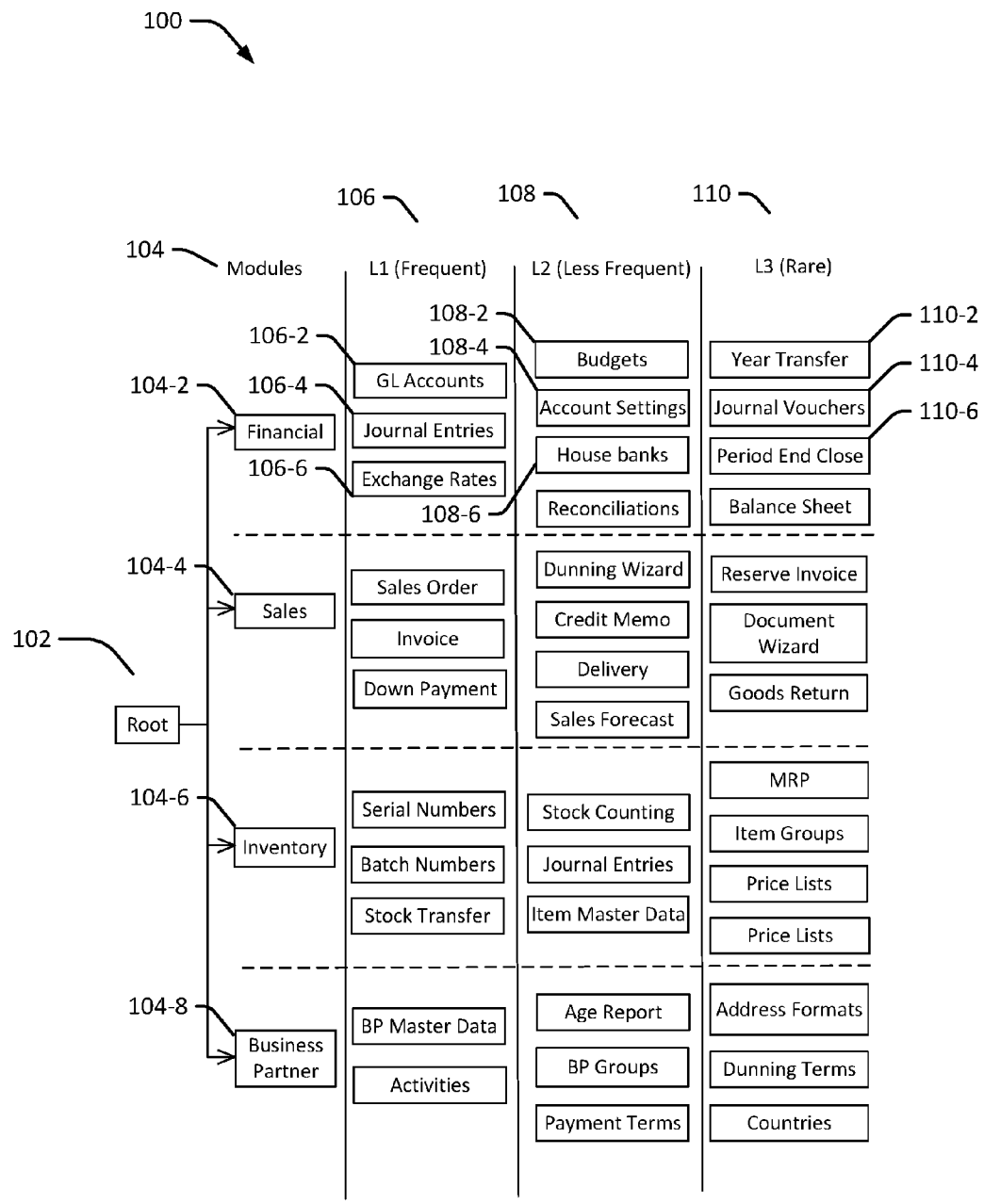
FIG. 1 illustrates an exemplary menu structure of a breadth-first menu system as described in present implementations herein.

FIG. 1 shows an exemplary menu structure called a breadth-first menu system 100 as described in present implementations herein. In an implementation, the breadth-first menu system 100 may enable a user (not shown) to navigate, for example, the whole menu tree in a breadth-first order fashion rather than a traditional depth-first order. In this implementation, the breadth-first menu system 100 may facilitate quick navigation and access to all menu entries while perfectly maintaining a logical structure of the menu and function modules available.

For example, the breadth-first menu system 100 includes Enterprise Resource Planning (ERP) menu items that are organized according to two factors, i.e., "module" and "importance". In this example, the module defines a functional aspect of a particular menu item, such as financial, sales, purchase, etc., while "importance" defines a frequency of usage (or usage-frequency) of the particular menu item. Based on these two factors, the breadth-first menu system 100 is presented in the format and/or structure as shown in FIG. 1.

As shown, a root or menu 102 includes modules 104 such as a financial module 104-2, a sales module 104-4, an inventory module 104-6 and a business partner module 104-8. The modules 104 may include top hierarchy menu items of the breadth-first menu system 100. The modules 104 may have additional (direct) child menu items and these additional child menu items may also be bracketed or structured according to their level of usage-frequency.

For example, a first level (L1) 106 denotes the level of "frequently" selected menu items; a second level (L2) 108 denotes the level of "less frequently" selected menu items; and a third level (L3) 110 denotes the level of "rarely" selected menu items. In this example, menu items hierarchy is not purely based on function modules but rather, the menu items hierarchy are also related and presented based on the usage-frequency. In this manner, a presentation of the menu items structure within a limited screen display in a mobile device facilitates convenience in navigation without compromising the number of modules and functions to display from the ERP menu items.

As shown, the first level 106 may include a first set of sub-modules that include default menu items during initial activation of the breadth-first menu system 100. The first set of sub-modules include GL accounts 106-2, journal entries 106-4, exchange rates 106-6, etc.

In an implementation, the first set of sub-modules in the first level 106 may be configured to occupy a designated position within the screen display of the mobile device. For example, the financial module 104-2 is indexed as a parent of the child sub-modules GL accounts 106-2, journal entries 106-4, and the exchange rates 106-6. In this example, each of these menu items may be configured to occupy a particular defined area and/or position when displayed on the screen display. A program logic that implements the breadth-first menu system 100 may correspondingly define the area and/or position of each menu item in a particular screen during the process. This initial positioning of each menu item may be utilized during an updating of the menu items.

For example, the program logic may be configured to update a change in level position when one menu item is dragged from one position or level to another position or level within its hierarchy. As an illustration, in the current presentation and format of the breadth-first menu system 100, the sub-module GL accounts 106-2 are dragged by a user from the first level 106 to the third level 110. In this illustration, the level positions of the financial module 104-2 and the child sub-module GL accounts 106-2 may be changed accordingly.

In an implementation, the program logic that implements the breadth-first menu system 100 may utilize different usage-thresholds among the menu items of different levels, such as L1, L2 and L3.

For example, when a particular menu item in the second level 108 is selected, this selection is detected, stored and counted as a usage-frequency for the particular menu item. In this example, when the usage-frequency (i.e., accumulation of the operation) for the particular menu item reaches the level-threshold, for example, of the first level 106, then the particular menu item is automatically promoted to the first level 106. The automatic promotion may be implemented when an updating is performed in the breadth-first menu system 100 to adjust menu levels or positions.

Figure 2A:
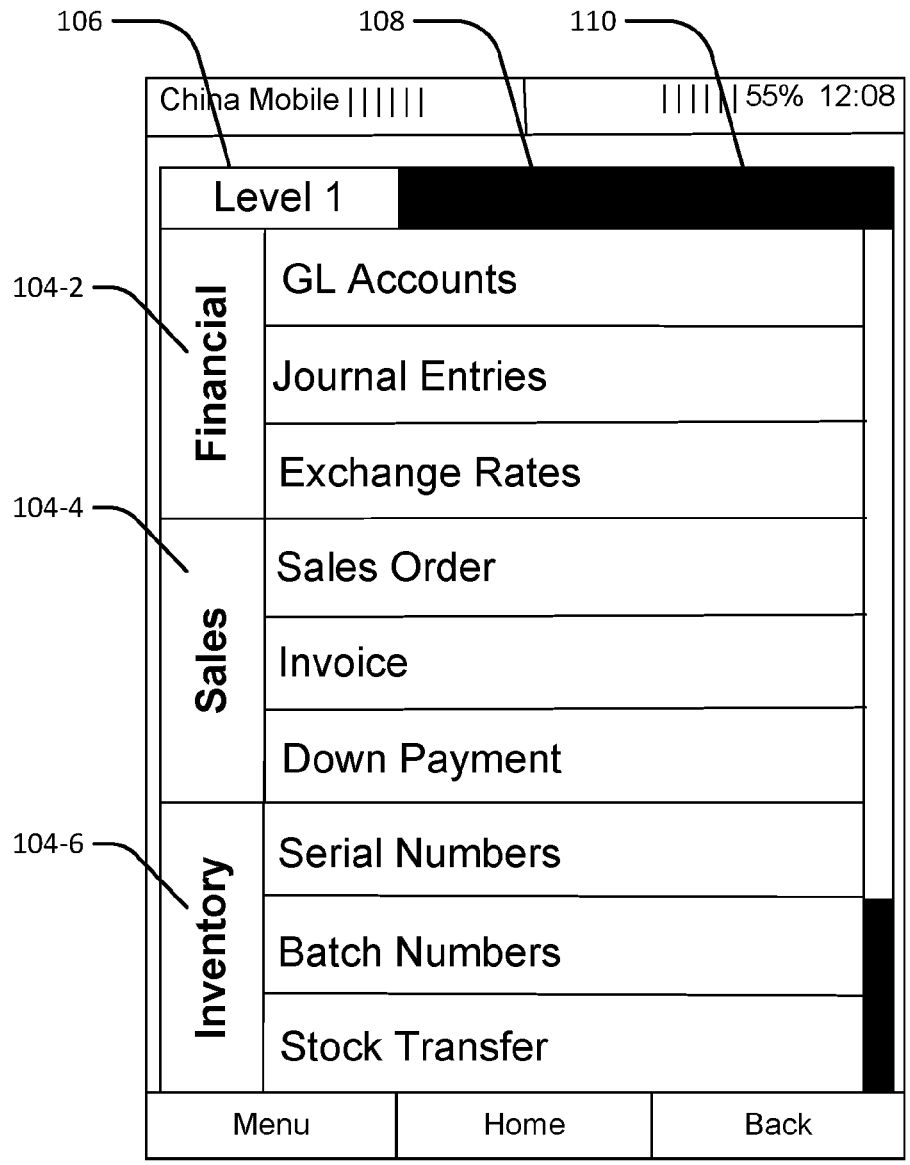
FIGS. 2A to 2C illustrate exemplary presentations of the breadth-first menu system in a user-interface or a screen display of a mobile device as described in present implementations herein.
Figure 2B:
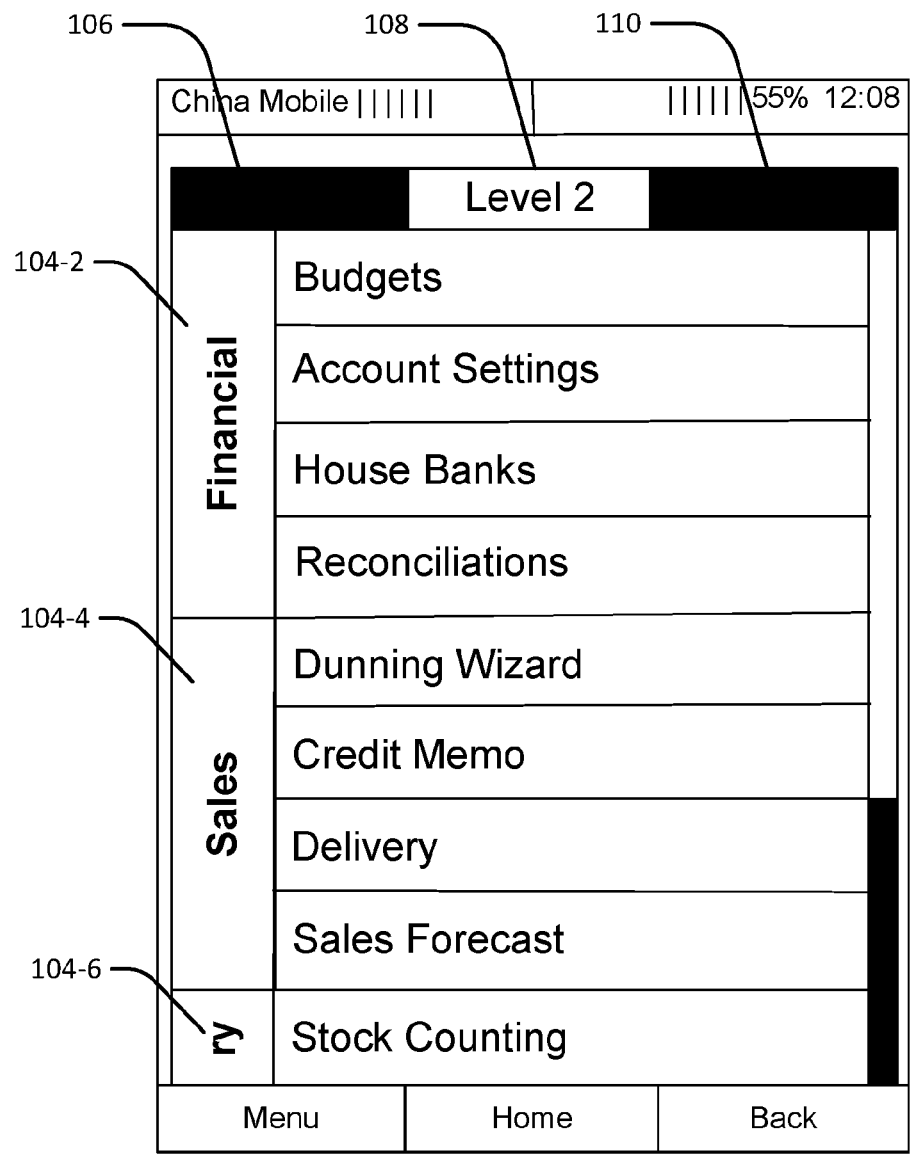
Figure 2C:
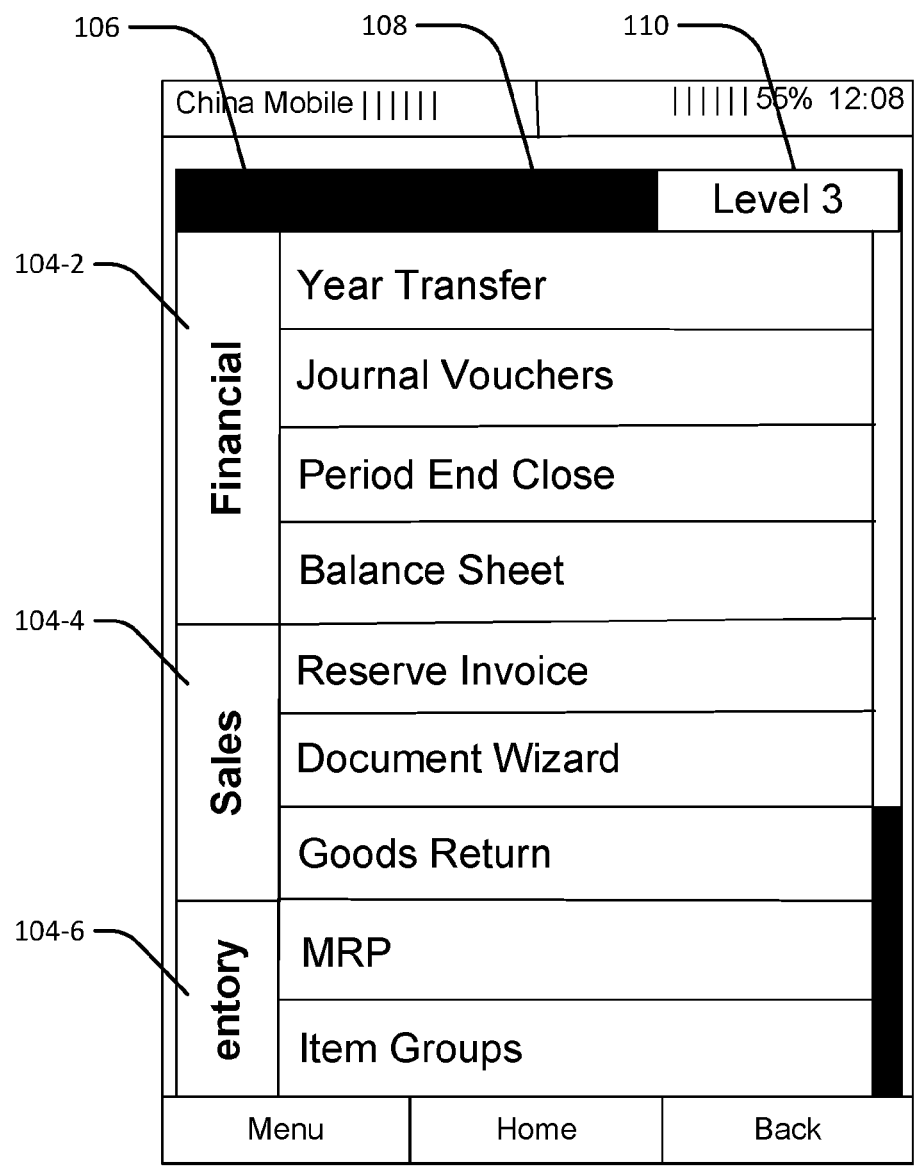

FIGS. 2A-2C show exemplary presentations of the breadth-first menu system 100 in a user-interface or screen display of a mobile device.

For example, FIG. 2A shows a default screen display when the breadth-first menu system 100 is initially activated. That is, the first level 106 displays the first set of sub-modules while other sets of sub-modules or menu items in the second level 108 and third level 110 are hidden. In this example, the user may navigate from one level to another level without going through all the levels in between. In other words, starting from the default screen display (i.e., first level 106), the user may display the set of sub-modules or menu items in the third level 110 by selecting this level or position and without the need of switching back and forth through the second level 108.

In an implementation, the modules may include indexes of the menu item list in each of the different levels. In this implementation, the indexing of the menu items may facilitate quick navigation and grouping of menu items in the different levels by their functional relations.

With continuing reference to FIG. 2B, the user navigates or scrolls from the first level 106 to the second level 108 and as shown, a second set of sub-modules (i.e., budgets 108-2, account settings 108-4, house banks 108-6, etc.) are displayed for user's consumption. As described earlier, the user may drag a selected menu item from the second level 108 and transfer the selected menu item to another level. In such a case, corresponding positions and locations of each menu item are updated, for example, after a pre-defined period of time.

FIG. 2C further displays a third set of sub-modules (i.e., year transfer 110-2, journal vouchers 110-4, period end close 110-6, etc.) when the user scrolls or navigates to the third level 110. Similar to FIGS. 2A and 2B, the menu items are displayed on the screen display as a flat list.

Although FIGS. 2A-2C show a limited number of levels or positions, the implementations described herein may include a fourth level, a fifth level, etc.

Figure 3:
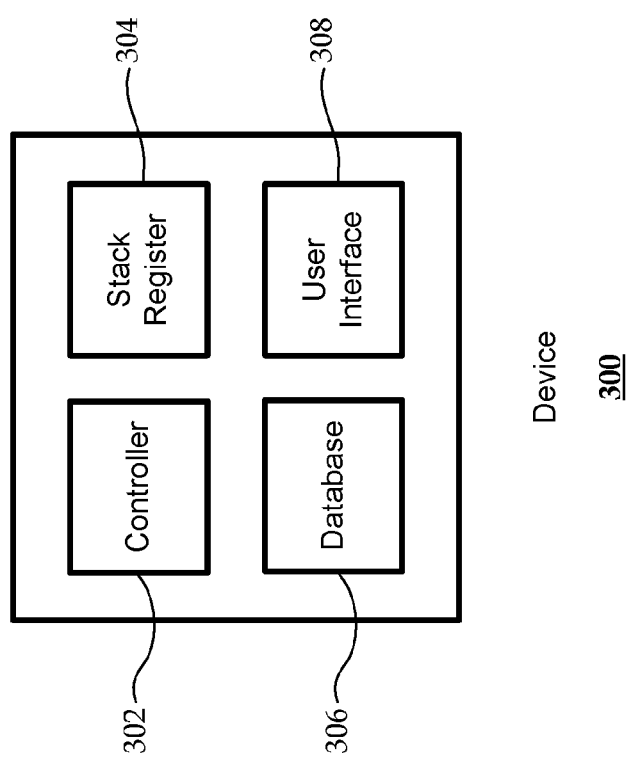
FIG. 3 illustrates an exemplary device system as described in present implementations herein.

FIG. 3 shows an example device 300 as described in present implementations herein. As shown, the device 300 includes a controller 302, a stack register 304, a database 306 and a user interface 308.

In an implementation, the device 300 may run different mobile web applications in its browser or operating system. One of the mobile web applications, for example, may implement the breadth-first menu system 100 as described in FIG. 1. In this example, the modules and sub-modules shown and discussed in the breadth-first menu system 100 may be manipulated by a program logic. That is, relationships between menu items, usage frequency, different levels, and the like, may be pre-defined in the program logic.

To implement the program logic for the breadth-first menu system 100, the device 300 utilizes the controller 302 to manipulate and manage switching of menu items in the stack register 304 and the database 306.

For example, the user opens and activates the web application for the breadth-first menu system through an input interface (not shown) in the device 300. In this example, the controller 302 facilitates loading of a default breadth-first data structure and displays the default menu items in a flat list. The default menu items may, for example, include the first set of sub-modules from the first level 106 as further illustrated in FIG. 2A above.

With the displayed default menu items, the controller 302 is configured to further receive user-input and to implement the program logic based on the user-input. For example, the user drags the sub-module GL accounts 106-2 from a top section of the first level 106 to a bottom section of the same first level 106. In this example, the controller 302 may replace the location and position of the sub-module GL accounts 106-2 in the stack register 304 on a next update. Furthermore, the controller 302 counts and stores this selection of the sub-module GL accounts 106-2 for comparison with the different usage-threshold for different levels (L1, L2 and L3).

In some implementations, the user may navigate the different levels (L1, L2 and L3) without going through all the levels in between. For example, with the displayed default menu items (i.e., first level 106), the user may click on the third level 110 and the controller 302 facilitates the display of sub-modules for the third level 110 in the user interface 308. In this example, the user navigates from the first level 106 to the third level 110 without the need of scrolling through the second level 108.

During the selection of the menu items in the breadth-first menu system 100, the controller 302 is configured to compare current usage-frequency of the selected menu items to the usage-threshold for different levels, such as L1, L2 and L3. When the usage-frequency of the selected menu item falls within the usage-threshold for a particular level (e.g., third level 110), then the controller 302 is configured to transfer the selected menu item to the third level 110 automatically and gives the user a notification of the automatic change. The usage-threshold for each level may be pre-defined in the program logic that implements the breadth-first menu system 100.

Examples of the device 300 may include (but are not limited to) a mobile phone, a cellular phone, a smartphone, a personal digital assistant, a netbook, a notebook computer, a multimedia playback device, a digital music player, a digital video player, a navigational device, a digital camera, and the like.

Examples of the database 306 may include a High-Performance Analytic Appliance (HANA) database to store the one or more web applications, the modules, sub-modules, and updated positions/locations of menu items.

Figure 4:
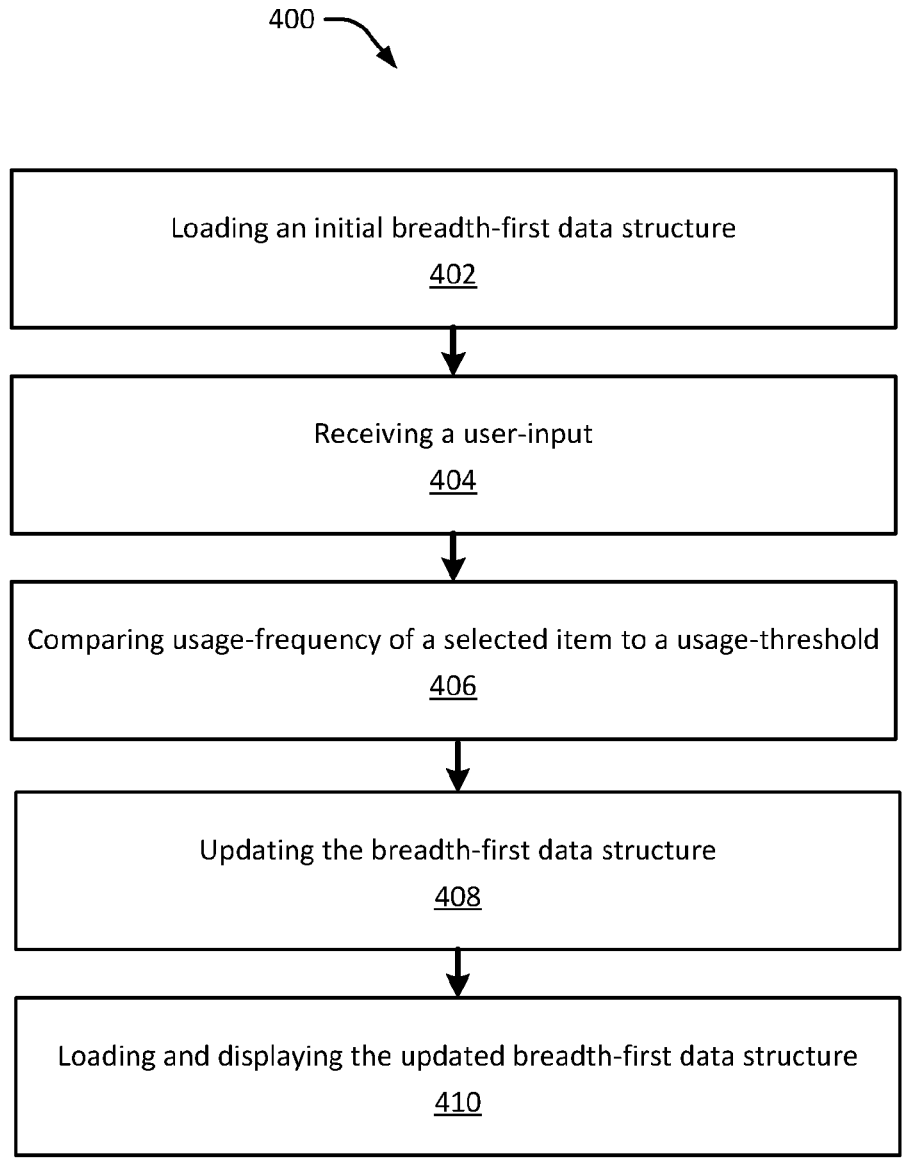
FIG. 4 illustrates an exemplary process for implementing, at least in part, the technology described herein.

FIG. 4 illustrates an exemplary process 400 for implementing, at least in part, the technology described herein. In particular, process 400 depicts a flow to implement a displaying of menu items, across different modules, at the same level on a screen to allow direct switching to different levels, i.e., without stepping back and forth in levels. The process 400 may be performed by a computing device or devices. An exemplary architecture of such a device is described below with reference to FIG. 5. In this particular example, the process 400 describes that certain acts are performed at or by a user or a system.

At 402, loading an initial breadth-first data structure is performed. For example, the initial breadth-first data structure includes the breadth-first menu system 100 as shown in FIG. 1. In this example, the data structure configures functionalities and frequency of usage into separate and/or different levels.

In an implementation, positions and relations between modules and sub-modules are initially defined by the program logic. Furthermore, the program logic may define initial usage-thresholds between different levels such as the first level 106, second level 108 and the third level 110.

At 404, receiving a user-input that includes selection of a menu item from the initial breadth-first data structure is performed. For example, the user may select and drag one indexed menu item from one position or level to another position or level. In this example, the controller 302 is configured to receive the user-input that forms the basis for updating operations.

At 406, comparing a usage-frequency of the selected item to a usage-threshold is performed. For example, the controller 302 compares the usage-frequency of the selected item to the usage-threshold for the first level 106, second level 108 and the third level 110.

At 408, updating the breadth-first data structure based on the user-input and based on the results of comparing a usage-frequency of the selected item to a usage-threshold is performed. For example, the controller 302 updates the database 306 after a particular set period of time. In this example, the controller 302 facilitates automatic transfer of position and/or level of the selected item to another position and/or location based on the accumulation of the operation on the selected item.

At 410, loading and displaying the updated breadth-first data structure is performed.

Figure 5:
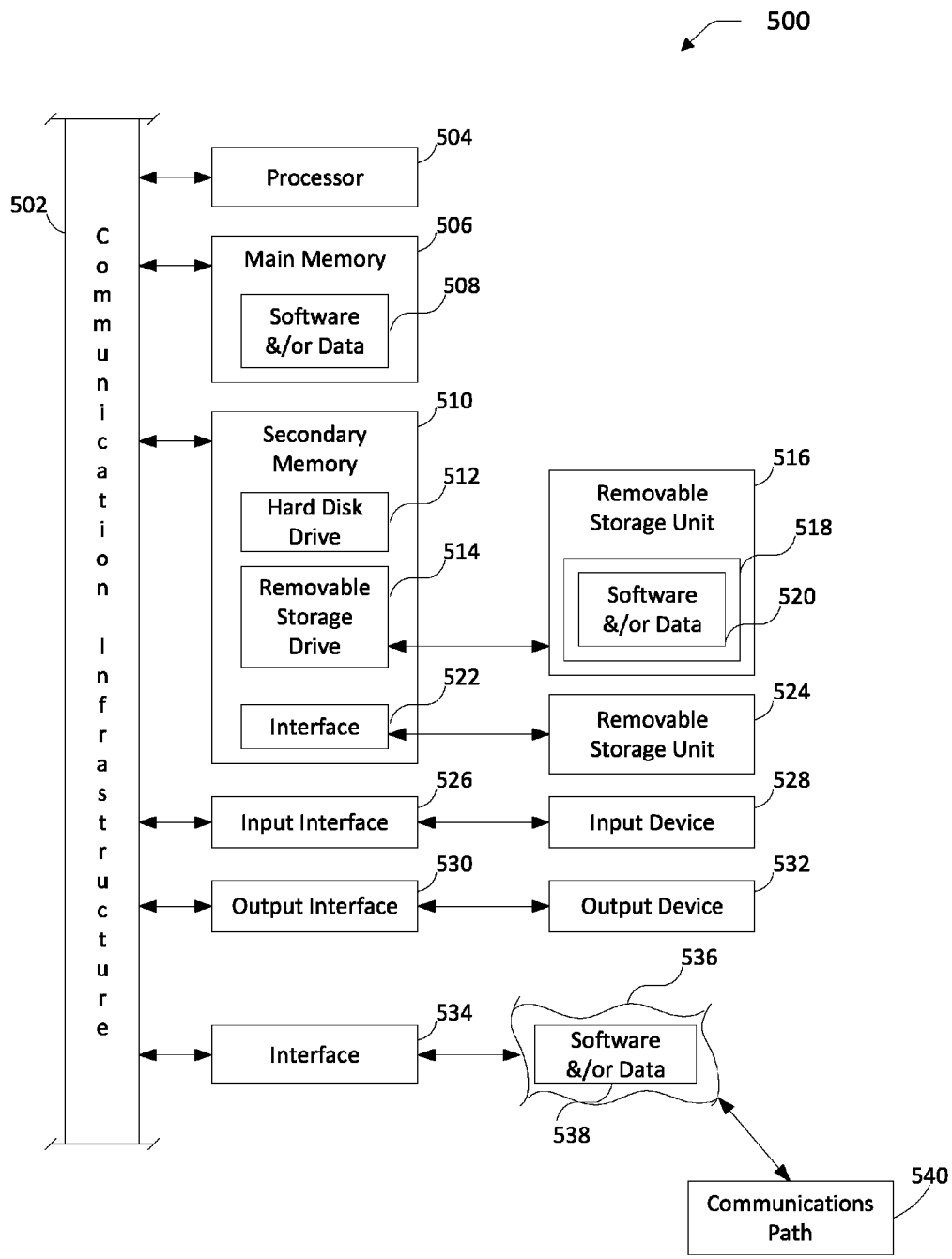
FIG. 5 illustrates an exemplary computing system to implement in accordance with the technologies described herein.

FIG. 5 illustrates an exemplary system 500 that may implement, at least in part, the technologies described herein. The computer system 500 includes one or more processors, such as processor 504. Processor 504 can be a special-purpose processor or a general-purpose processor. Processor 504 is connected to a communication infrastructure 502 (for example, a bus or a network). Depending upon the context, the computer system 500 may also be called a client device.

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, a magnetic tape, an optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices.

Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 516, removable storage unit 524, and a hard disk installed in hard disk drive 512. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Such computer programs, when executed, enable computer system 500 to implement the present technology described herein. In particular, the computer programs, when executed, enable processor 504 to implement the processes of aspects of the above. Accordingly, such computer programs represent controllers of the computer system 500. Where the technology described herein is implemented, at least in part, using software, the software may be stored in a computer program product and loaded into computer system 500 using removable storage drive 514, interface 522, hard disk drive 512 or communications interface 534.

The technology described herein may be implemented as computer program products comprising software stored on any computer useable medium. Such software, when executed in one or more data processing devices, causes data processing device(s) to operate as described herein. Exemplary illustrations of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Micro-electromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more exemplary illustrations described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of displaying menu items that allows direct switching to different levels, the method being implemented by at least one computing device and comprising:

loading the menu items from an initial breadth-first data structure in a database of the at least one computing device, wherein the menu items are structured based on modules and importance of the modules;

displaying a menu comprising the menu items and user-selectable elements indicating the different levels of importance of the modules in a user interface of the at least one computing device, wherein the user-selectable elements enable a user to directly select and display one of the different levels of the menu items from across different function modules while hiding menu items associated with levels other than the selected displayed level, wherein there are at least two different function modules being concurrently displayed in the menu for the selected level, wherein the user-selected elements for the displayed one of the different levels of the menu items are concurrently displayed across respective tabs, wherein the different levels are determined by frequencies of usage;

receiving a user-input that includes a selection of at least one menu item at the selected level;

counting the user-input to accumulate a usage-frequency for the at least one menu item and storing the usage-frequency for the at least one menu item in the initial breadth-first data structure;

comparing the usage-frequency of the selected at least one menu item to a usage-threshold for a particular menu level;

when the usage-frequency for the selected at least one menu item reaches the usage-threshold for the particular menu level, automatically promoting the selected at least one menu item to that menu level while updating the initial breadth-first data structure; and loading the updated breadth-first data structure and displaying the menu accordingly.

2. The method according to claim 1, wherein the importance of the modules comprises a first level, a second level, and a third level of importance, wherein the first level, the second level, and the third level of importance correspond to frequently selected, less frequently selected, and rarely selected menu items, respectively.

3. The method according to claim 1, wherein the initial breadth-first data structure is configured in a program logic to move the menu items between a first level, a second level, and a third level, wherein the moving of the menu items is facilitated by the selection of the at least one menu item in the user-input.

4. The method according to claim 1, wherein the usage-threshold is different for a first level, a second level, and a third level.

5. The method according to claim 1 wherein the usage-frequency comprises a number of times that the at least one menu item is selected.

6. The method according to claim 1, wherein the displaying the menu comprises displaying the initial breadth-first data structure as a flat list.

7. The method according to claim 1, wherein the updating comprises changing locations and positions of the selected at least one menu item in a stack register or the database.

8. A mobile device comprising:
one or more processors; and
one or more non-transitory computer-readable media in communication with the one or more processors, the one or more non-transitory computer-readable media stores processor-executable instructions that when executed cause the one or more processors to perform operations to:
load menu items of an initial breadth-first data structure from a database of the mobile device, wherein the menu items are structured based on modules and importance of the modules;
display a menu comprising the menu items and user-selectable elements indicating the different levels of importance of the modules in a user interface of the mobile device, wherein the user-selectable elements enable a user to directly select and display one of the different levels of the menu items from across different function modules while hiding menu items associated with levels other than the selected displayed level, wherein there are at least two different function modules being concurrently displayed in the menu for the selected level, wherein the user-selected elements for the displayed one of the different levels of the menu items are concurrently displayed across respective tabs, wherein the different levels are determined by frequencies of usage;
receive a user-input that includes a selection of at least one menu item at the selected level;
count the user-input to accumulate a usage-frequency for the at least one menu item and store the usage-frequency for the at least one menu item in the initial breadth-first data structure;
compare the usage-frequency of the selected at least one menu item to a usage-threshold for a particular menu level;
when the usage-frequency for the selected at least one menu item reaches the usage-threshold for the particular menu level,
automatically promote the selected at least one menu item to that menu level while updating the initial breadth-first data structure; and
load the updated initial breadth-first data structure and display the menu accordingly.

9. The mobile device according to claim 8, wherein the importance of the modules comprises a first a second level, and a third level of importance, wherein the first level, the second level, and the third level of importance correspond to frequently selected, less frequently selected, and rarely selected menu items, respectively.

10. The mobile device according to claim 8, wherein the usage-threshold is different for a first level, a second level, and a third level.

11. The mobile device according to claim 8, wherein the usage-frequency comprises a number of times that the at least one menu item is selected.

12. The mobile device according to claim 8, wherein the displaying the updated breadth-first data structure comprises displaying the updated breadth-first data structure as a flat list.

13. One or more non-transitory computer-readable media storing processor-executable instructions that when executed cause one or more processors of at least one computing device to perform operations comprising:
loading menu items of a breadth-first data structure from a database of the at least one computing device, wherein the menu items are structured based on modules and importance of the modules;
displaying a menu comprising the menu items and user-selectable elements indicating the different levels of importance of the modules in a user interface of the at least one computing device, wherein the user-selectable elements enable a user to directly select and display one of the different levels of the menu items from across different function modules while hiding menu items associated with levels other than the selected displayed level, wherein there are at least two different function modules being concurrently displayed in the menu for the selected level, wherein the user-selected elements for the displayed one of the different levels of the menu items are concurrently displayed across respective tabs, wherein the different levels are determined by frequencies of usage;
receiving a user-input that includes a selection of at least one menu item at the selected level;
counting the user-input to accumulate a usage-frequency for the at least one menu item and storing the usage-frequency for the at least one menu item in the breadth-first data structure;
comparing the usage-frequency of the selected at least one menu item to a usage-threshold for a particular menu level;
when the usage-frequency for the selected at least one menu item reaches the usage-threshold for the particular menu level,
automatically promoting the selected at least one menu item to that menu level while updating the breadth-first data structure; and loading the updated breadth-first data structure and displaying the menu accordingly.

14. The one or more non-transitory computer-readable media according to claim 13, wherein the importance of the modules comprises a first a second level; and a third level of importance, wherein the first level, the second level; and the third level of importance correspond to frequently selected, less frequently selected, and rarely selected menu items, respectively.

15. The one or more non-transitory computer-readable media according to claim 13, wherein the breadth-first data structure is configured by a program logic to move the menu items between a first level, a second level, and a third level, wherein the moving of the menu items is facilitated by the selection of the at least one menu item in the user-input.

16. The one or more non-transitory computer-readable media according to claim 13, wherein the usage-threshold is different for a first level, a second level, and a third level.

17. The one or more non-transitory computer-readable media according to claim 13, wherein the usage-frequency comprises a number of times that the at least one menu item is selected.

18. The one or more non-transitory computer-readable media according to claim 13, wherein the displaying the updated breadth-first data structure comprises displaying the updated breadth-first data structure as a flat list.

\* \* \* \* \*